United States Patent
Lee et al.

(10) Patent No.: US 10,342,065 B2
(45) Date of Patent: Jul. 2, 2019

(54) METHOD AND APPARATUS FOR OPERATING AT CELL NOT SUPPORTING EXTENDED DRX IN WIRELESS COMMUNICATION SYSTEM

(71) Applicant: LG ELECTRONICS INC., Seoul (KR)

(72) Inventors: Youngdae Lee, Seoul (KR); Jinsook Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/563,507

(22) PCT Filed: Apr. 18, 2016

(86) PCT No.: PCT/KR2016/003982
§ 371 (c)(1),
(2) Date: Sep. 29, 2017

(87) PCT Pub. No.: WO2016/167616
PCT Pub. Date: Oct. 20, 2016

(65) Prior Publication Data
US 2018/0092158 A1    Mar. 29, 2018

Related U.S. Application Data

(60) Provisional application No. 62/148,194, filed on Apr. 16, 2015.

(51) Int. Cl.
*G08C 17/00* (2006.01)
*H04W 76/28* (2018.01)
(Continued)

(52) U.S. Cl.
CPC ............ *H04W 76/28* (2018.02); *H04L 29/08* (2013.01); *H04L 67/22* (2013.01); *H04L 69/04* (2013.01);
(Continued)

(58) Field of Classification Search
CPC . H04W 76/28; H04W 52/0229; H04W 48/02; H04W 36/24; H04W 8/08;
(Continued)

(56) References Cited

U.S. PATENT DOCUMENTS 9,398,501 B1 * 7/2016 Liu .................. H04W 36/0083
9,504,012 B1 * 11/2016 Ljung .............. H04W 36/0083
(Continued)

FOREIGN PATENT DOCUMENTS

| WO | 2014015387 | 4/2014 |
|----|------------|--------|
| WO | 2014051387 | 4/2014 |
| WO | 2015016530 | 2/2015 |

OTHER PUBLICATIONS

PCT International Application No. PCT/KR2016/003982, International Search Report dated Jul. 25, 2016, 2 pages.
(Continued)

*Primary Examiner* — Mang Hang Yeung
(74) *Attorney, Agent, or Firm* — Lee Hong Degerman Kang Waimey

(57) ABSTRACT

A method and apparatus for operating at a cell not supporting an extended discontinuous reception (eDRX) in a wireless communication system is provided. A user equipment (UE) verifies whether or not a serving cell supports eDRX. If it is determined that the serving cell does not support eDRX, the UE may trigger a tracking area update (TAU). Further, the UE may applying normal DRX cycle at the serving cell and not performing eDRX for a paging reception.

12 Claims, 8 Drawing Sheets

(51) Int. Cl.
   *H04L 29/08*   (2006.01)
   *H04L 29/06*   (2006.01)
   *H04W 76/20*   (2018.01)
   *H04W 8/08*    (2009.01)
   *H04W 36/24*   (2009.01)
   *H04W 48/02*   (2009.01)
   *H04W 52/02*   (2009.01)

(52) U.S. Cl.
   CPC ............... *H04L 69/22* (2013.01); *H04W 8/08* (2013.01); *H04W 36/24* (2013.01); *H04W 48/02* (2013.01); *H04W 52/0229* (2013.01); *H04W 76/20* (2018.02); *Y02D 70/00* (2018.01); *Y02D 70/1224* (2018.01); *Y02D 70/1226* (2018.01); *Y02D 70/1242* (2018.01); *Y02D 70/1262* (2018.01); *Y02D 70/142* (2018.01); *Y02D 70/146* (2018.01); *Y02D 70/20* (2018.01); *Y02D 70/21* (2018.01); *Y02D 70/23* (2018.01); *Y02D 70/24* (2018.01)

(58) Field of Classification Search
   CPC ........ H04W 76/20; H04L 69/22; H04L 69/04; H04L 67/22; H04L 29/08
   USPC .......................................................... 370/311
   See application file for complete search history.

(56) References Cited

U.S. PATENT DOCUMENTS

| | | |
|---|---|---|
| 2014/0018075 A1 | 1/2014 | Verger et al. |
| 2014/0329529 A1 | 11/2014 | Jung et al. |
| 2018/0176883 A1* | 6/2018 | Fujishiro ........... H04W 52/0225 |

OTHER PUBLICATIONS

Huawei, et al., "Discussion on Extended DRX cycle mechanism", R2-150508, 3GPP TSG-RAN WG2 Meeting #89, Feb. 2015, 5 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 3GPP TS 36.300 V12.5.0 , Mar. 2015, 251 pages.

* cited by examiner

METHOD AND APPARATUS FOR OPERATING AT CELL NOT SUPPORTING EXTENDED DRX IN WIRELESS COMMUNICATION SYSTEM

CROSS-REFERENCE TO RELATED APPLICATIONS

This application is the National Stage filing under 35 U.S.C. 371 of International Application No. PCT/KR2016/003982, filed on Apr. 18, 2016, which claims the benefit of U.S. Provisional Application No. 62/148,194, filed on Apr. 16, 2015, the contents of which are all hereby incorporated by reference herein in their entirety.

BACKGROUND OF THE INVENTION

Field of the Invention

The present invention relates to wireless communications, and more particularly, to a method and apparatus for operating at a cell not supporting an extended discontinuous reception (eDRX) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Power consumption is important for UEs using battery or an external power supply and its importance increases with the continued growth of device populations and more demanding use cases. The importance can be illustrated by following scenarios, e.g.:

For machine-to-machine (M2M) use cases like sensors that run on battery, it is a major cost to on site exchange (or charge) the batteries for a large amount of devices and the battery lifetime may even determine the device's lifetime if it is not foreseen to charge or replace the battery;

Even for scenarios where UEs may consume power from an external power supply, it may be desirable to consume less power for energy efficiency purposes.

For reducing power consumptions, 3GPP had introduced concept of discontinuous reception (DRX). DRX is a method used in mobile communication to conserve the battery of the mobile device. The mobile device and the network negotiate phases in which data transfer occurs. During other times, the device turns its receiver off and enters a low power state. Further, 3GPP has introduced a power saving mode which is configured and controlled by non-access stratum (NAS) that allows the UE to reduce its power consumption.

Machine-type communication (MTC) is an important revenue stream for operators and has a huge potential from the operator perspective. There are several industry for a working on an efficient machine-to-machine (M2M) system with some industry members developing a new access technology dedicated for MTC. However, it is more efficient for operators to be able to serve MTC user equipment (UE) using already deployed radio access technology. Therefore it is important for operators to understand whether LTE could be a competitive radio access technology for efficient support of MTC. It is envisaged that MTC UE's will be deployed in huge numbers, large enough to create an ecosystem on its own. Lowering the cost of MTC UE's is an important enabler for implementation of the concept of "internet of things". MTC UE's used for many applications will require low operational power consumption and are expected to communicate with infrequent small burst transmissions.

DRX or PSM described above may be not enough for reducing power consumption in MTC or various other features. An extended DRX (eDRX) operation has been discussed, and accordingly, enhancement of eDRX operation may be required.

SUMMARY OF THE INVENTION

The present invention provides a method and apparatus for operating at a cell not supporting an extended discontinuous reception (eDRX) in a wireless communication system. The present invention provides a method and apparatus for triggering a tracking area update (TAU) or applying a normal paging DRX cycle when a serving cell does not support eDRX.

In an aspect, a method for operating, by a user equipment (UE), at a cell not supporting an extended discontinuous reception (eDRX) in a wireless communication system is provided. The method includes verifying whether or not a serving cell supports eDRX, and triggering a tracking area update (TAU) if it is determined that the serving cell does not support eDRX.

In another aspect, a user equipment (UE) in a wireless communication system is provided. The UE includes a memory, a transceiver, and a processor coupled to the memory and the transceiver. The processor is configured to verify whether or not a serving cell supports eDRX, and trigger a tracking area update (TAU) if it is determined that the serving cell does not support eDRX.

A user equipment (UE) can operate at a cell not supporting eDRX efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
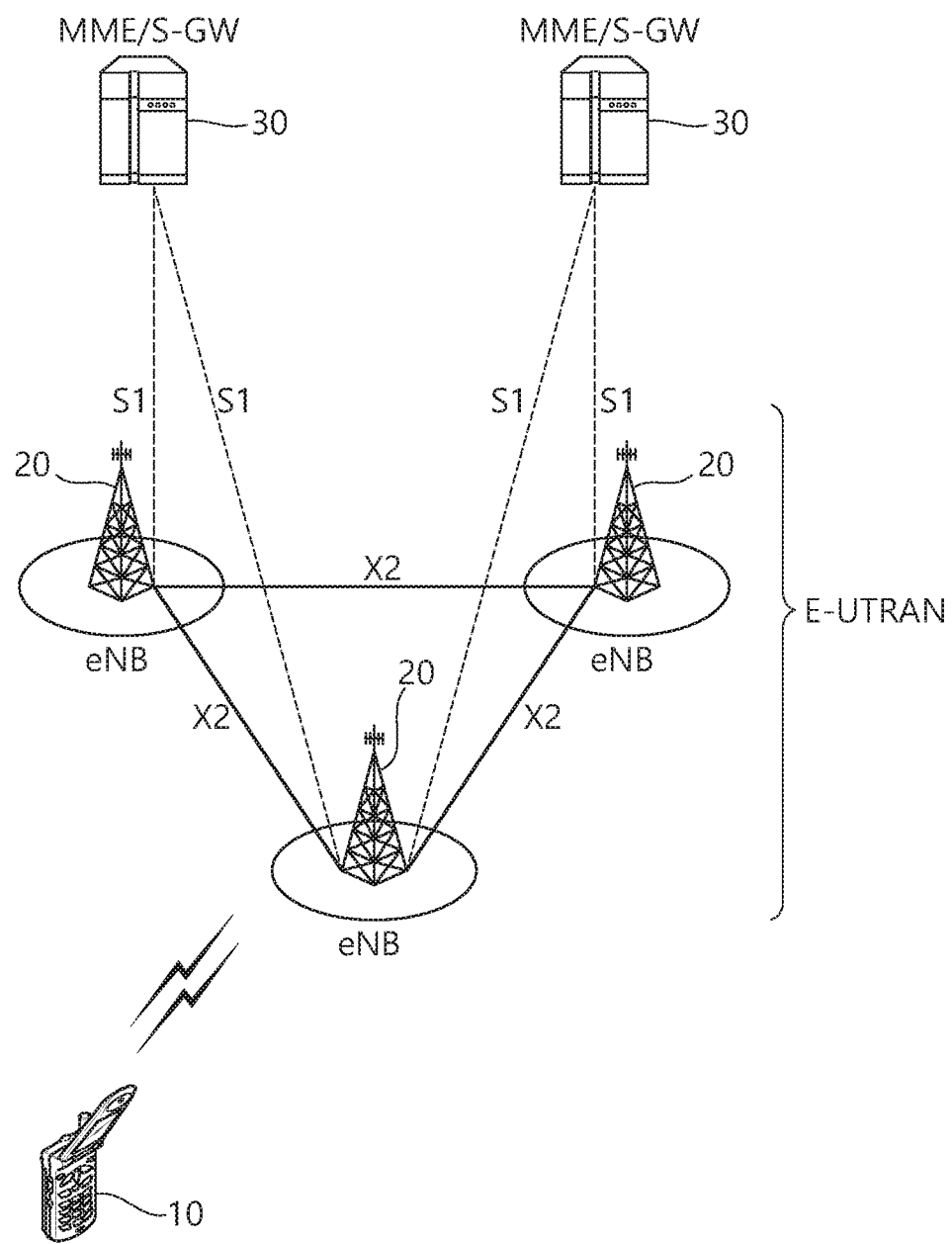
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
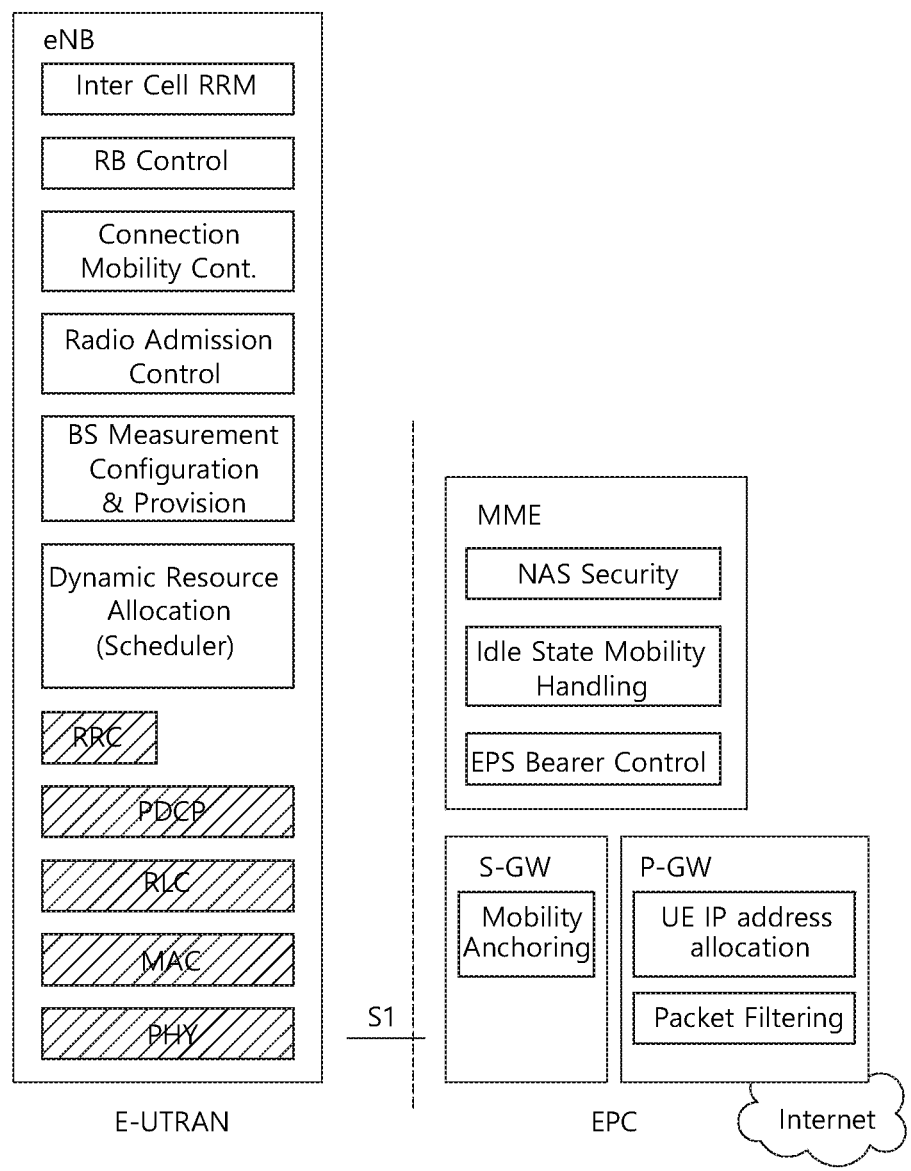
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
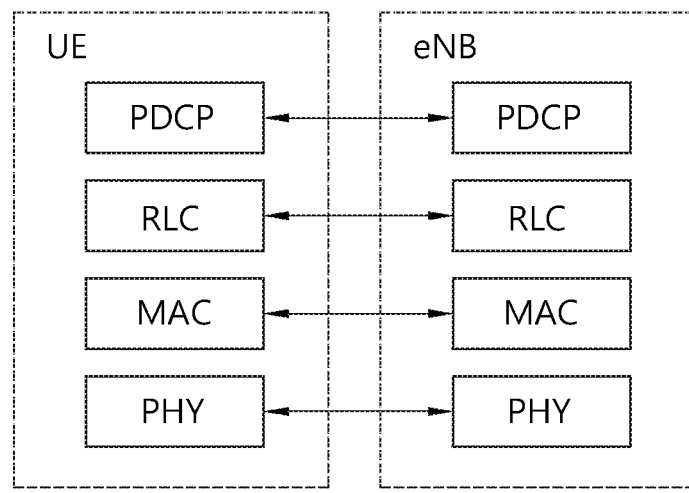
FIG. 3 shows a block diagram of a user plane protocol stack of an LTE system.
Figure 4:
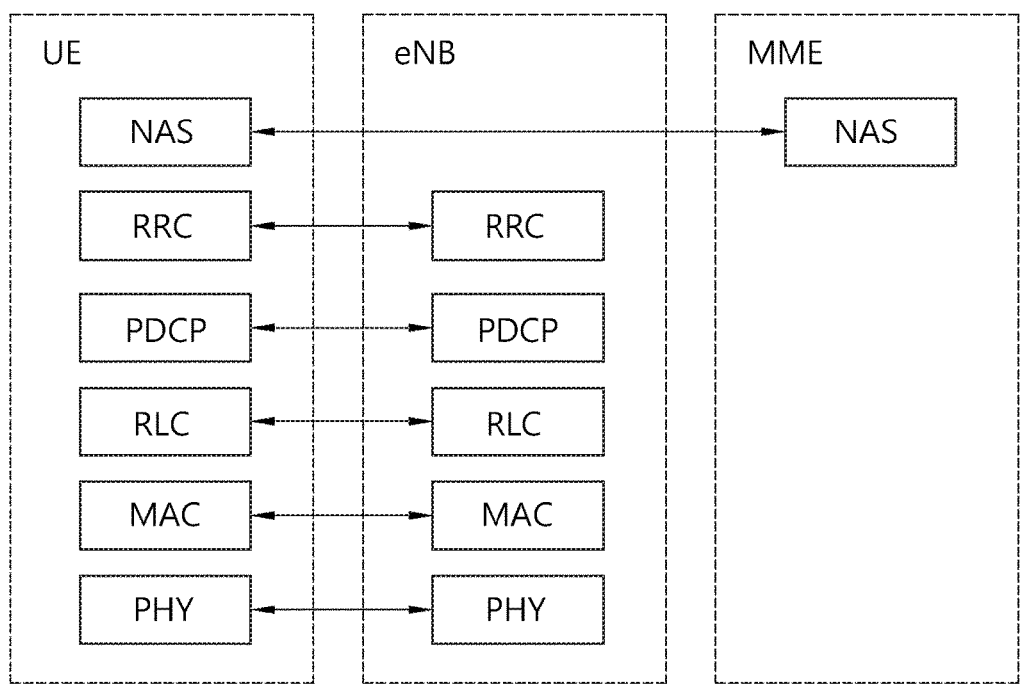
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
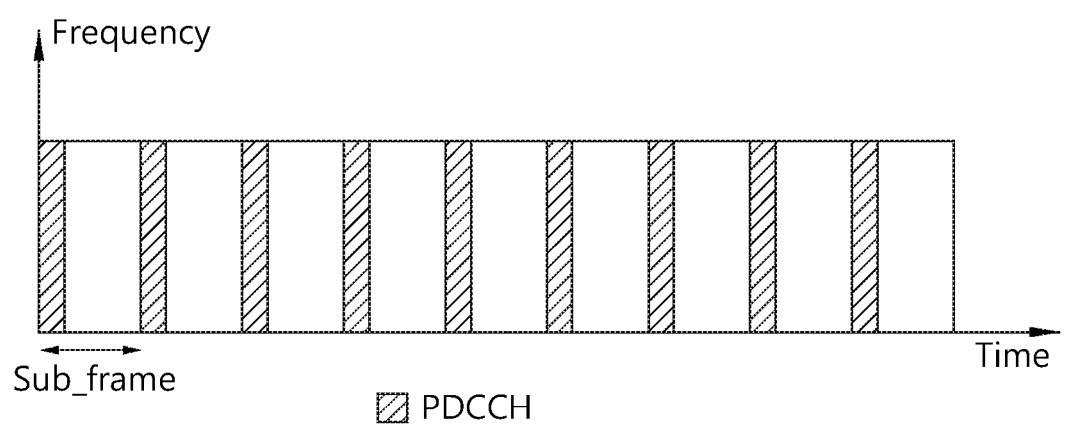
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Discontinuous reception (DRX) is described. It may be referred to Section 12 of 3GPP TS 36.300 V12.5.0 (2015-

03). In order to enable reasonable UE battery consumption, DRX in E-UTRAN is characterized by the following:

Per UE mechanism (as opposed to per radio bearer);

No RRC or MAC substate to distinguish between different levels of DRX;

Available DRX values are controlled by the network and start from non-DRX up to x seconds. Value x may be as long as the paging DRX used in evolved packet system (EPS) connection management (ECM) idle mode (ECM-IDLE);

Measurement requirement and reporting criteria can differ according to the length of the DRX interval, i.e. long DRX intervals may experience more relaxed requirements;

Irrespective of DRX, UE may use first available RACH opportunity to send an UL measurement report;

HARQ operation related to data transmission is independent of DRX operation and the UE wakes up to read the PDCCH for possible retransmissions and/or ACK/NAK signalling regardless of DRX. In the downlink, a timer is used to limit the time the UE stays awake awaiting for a retransmission;

When DRX is configured, the UE may be further configured with an "on-duration" timer during which time the UE monitors the PDCCHs for possible allocations;

When DRX is configured, periodic channel quality indicator (CQI) reports can only be sent by the UE during the "active-time". RRC can further restrict periodic CQI reports so that they are only sent during the on-duration;

A timer per timing advance group (TAG) in the UE is used to detect need for obtaining timing advance for each TAG.

The following definitions apply to DRX in E-UTRAN:

on-duration: duration in downlink subframes that the UE waits for, after waking up from DRX, to receive PDCCHs. If the UE successfully decodes a PDCCH, the UE stays awake and starts the inactivity timer;

inactivity-timer: duration in downlink subframes that the UE waits to successfully decode a PDCCH, from the last successful decoding of a PDCCH, failing which it re-enters DRX. The UE shall restart the inactivity timer following a single successful decoding of a PDCCH for a first transmission only (i.e. not for retransmissions).

active-time: total duration that the UE is awake. This includes the "on-duration" of the DRX cycle, the time UE is performing continuous reception while the inactivity timer has not expired and the time UE is performing continuous reception while waiting for a DL retransmission after one HARQ round trip time (RTT). Based on the above the minimum active time is of length equal to on-duration, and the maximum is undefined (infinite);

Of the above parameters the on-duration and inactivity-timer are of fixed lengths, while the active-time is of varying lengths based on scheduling decision and UE decoding success. Only on-duration and inactivity-timer duration are signaled to the UE by the eNB:

There is only one DRX configuration applied in the UE at any time;

UE shall apply an on-duration on wake-up from DRX sleep;

New transmissions can only take place during the active-time (so that when the UE is waiting for one retransmission only, it does not have to be "awake" during the RTT).

If PDCCH has not been successfully decoded during the on-duration, the UE shall follow the DRX configuration (i.e. the UE can enter DRX sleep if allowed by the DRX configuration). This applies also for the sub-frames where the UE has been allocated predefined resources.

If it successfully decodes a PDCCH for a first transmission, the UE shall stay awake and start the inactivity timer (even if a PDCCH is successfully decoded in the sub-frames where the UE has also been allocated predefined resources) until a MAC control message tells the UE to re-enter DRX, or until the inactivity timer expires. In both cases, the DRX cycle that the UE follows after re-entering DRX is given by the following rules. If a short DRX cycle is configured, the UE first follows the short DRX cycle and after a longer period of inactivity the UE follows the long DRX cycle. Else, the UE follows the long DRX cycle directly.

When the UE is in RRC_IDLE, the UE may perform a paging operation for receiving mobile terminating (MT) calls and a TAU operation for network reachability update, according to DRX cycle. The purpose of paging procedure is to transmit paging information to a UE in RRC_IDLE and/or to inform UEs in RRC_IDLE and UEs in RRC_CONNECTED about a system information change and/or to inform about an earthquake and tsunami warning system (ETWS) primary notification and/or ETWS secondary notification and/or to inform about a commercial mobile alert system (CMAS) notification. The paging information is provided to upper layers, which in response may initiate RRC connection establishment, e.g. to receive an incoming call.

E-UTRAN initiates the paging procedure by transmitting the Paging message at the UE's paging occasion. E-UTRAN may address multiple UEs within the Paging message by including one PagingRecord for each UE. E-UTRAN may also indicate a change of system information, and/or provide an ETWS notification or a CMAS notification in the Paging message. Upon receiving the Paging message, the UE shall:

1> if in RRC_IDLE, for each of the PagingRecord, if any, included in the Paging message:

2> if the ue-Identity included in the PagingRecord matches one of the UE identities allocated by upper layers:

3> forward the ue-Identity and the cn-Domain to the upper layers;

1> if the systemInfoModification is included:

2> re-acquire the required system information using the system information acquisition procedure.

1> if the etws-Indication is included and the UE is ETWS capable:

2> re-acquire SystemInformationBlockType1 immediately, i.e. without waiting until the next system information modification period boundary;

2> if the schedulingInfoList indicates that SystemInformationBlockType10 is present:

3> acquire SystemInformationBlockType10;

2> if the schedulingInfoList indicates that SystemInformationBlockType11 is present:

3> acquire SystemInformationBlockType11;

1> if the cmas-Indication is included and the UE is CMAS capable:

2> re-acquire SystemInformationBlockType1 immediately, i.e., without waiting until the next system information modification period boundary;

2> if the schedulingInfoList indicates that SystemInformationBlockType12 is present:

3> acquire SystemInformationBlockType12;

1> if in RRC_IDLE, the eab-ParamModification is included and the UE is EAB capable:

2> consider previously stored SystemInformationBlockType14 as invalid;

2> re-acquire SystemInformationBlockType1 immediately, i.e. without waiting until the next system information modification period boundary;

2> re-acquire SystemInformationBlockType14 using the system information acquisition procedure;

The UE may use DRX in idle mode in order to reduce power consumption. One paging occasion (PO) is a subframe where there may be paging radio network temporary identity (P-RNTI) transmitted on PDCCH addressing the paging message. One paging frame (PF) is one radio frame, which may contain one or multiple PO(s). When DRX is used, the UE needs only to monitor one PO per DRX cycle.

PF and PO is determined by using the DRX parameters provided in system information. PF is given by equation, SFN mod T=(T div N)*(UE_ID mod N). Index i_s pointing to PO from subframe pattern defined Table 1 and Table 2 will be derived from calculation, i_s=floor(UE_ID/N) mod Ns. Table 1 shows subframe patterns for FDD and Table 2 shows subframe patterns for TDD (all UL/DL configurations).

TABLE 1

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 2

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

System information DRX parameters stored in the UE shall be updated locally in the UE whenever the DRX parameter values are changed in SI. If the UE has no international mobile subscriber identity (IMSI), for instance when making an emergency call without universal subscriber identification module (USIM), the UE shall use as default identity UE_ID=0 in the PF and i_s formulas above.

The following parameters are used for the calculation of the PF and i_s:

T: DRX cycle of the UE. T is determined by the shortest of the UE specific DRX value, if allocated by upper layers, and a default DRX value broadcast in system information. If UE specific DRX is not configured by upper layers, the default value is applied.

nB: 4T, 2T, T, T/2, T/4, T/8, T/16, T/32.

N: min(T,nB).

Ns: max(1,nB/T).

UE_ID: IMSI mod 1024.

IMSI is given as sequence of digits of type integer (0..9), IMSI shall in the formulae above be interpreted as a decimal integer number, where the first digit given in the sequence represents the highest order digit. For example, when IMSI=12 (digit1=1, digit2=2), in the calculations, this shall be interpreted as the decimal integer "12", not "1×16+ 2=18".

In Rel-12, 3GPP adopted a NAS layer defined power saving mode (PSM) solution for power consumption enhancement. PSM allows the UE to save battery by negotiating with the network periods for which the UE becomes unreachable, in which case the UE stops access stratum activities. The UE exits this mode when it has mobile originated data pending, or when the periodic TAU timer expires.

However, PSM has limited applicability for unscheduled MT data with some requirement on delay tolerance. In this case, the UE would need to negotiate periodic TAU timer equal (or slightly shorter) than the maximum allowed delay tolerance for MT data. If the maximum allowed delay tolerance is not in the order of many hours, the PSM solution introduces an important increase in signalling due to more frequent periodic TAU procedures. It also suffers in terms of power consumption performance because the UE would be required to "wake up" very frequently in order to perform this signalling. Furthermore, for MT data that is infrequent, most of the wake up procedures would turn out to be entirely unnecessary and thus power inefficient.

A more flexible approach that addresses the scenarios not suitable for PSM such as the one described above is to enhance DRX operation. Unlike PSM, DRX makes the UE reachable during pre-defined occasions without resulting in unnecessary signaling.

As currently defined, however, DRX cycles in LTE can at most be 2.56 s and thus would not allow for sufficient power savings for UEs that only need to wake-up infrequently (e.g. every few or tens of minutes) for MT data.

Hence, extended DRX (eDRX) cycle is required in order to enable significant battery savings for such UEs. Furthermore, the DRX cycle can be set depending on the data delay tolerance and power saving requirements, thus providing a flexible solution for achieving significant UE battery savings.

That is, extending the DRX cycle in scenarios where MT data has a delay tolerance in the order of minutes to an hour has been discussed. Idle mode DRX cycles may be extended in order to provide at least an order of magnitude power savings for UEs in idle mode. Further, connected mode DRX cycles may be extended in order to enable additional power savings beyond what is currently possible for UEs in connected mode. By eDRX, the DRX cycle for both idle and connected mode may be extended beyond 2.56 s and up to values to be determined by the network.

However, the existing system frame number (SFN) numbering cannot support a DRX cycle extended to a value beyond 10.24 s, since the SFN can be numbered up to only 1024. Thus, if a DRX cycle is extended to a value beyond 10.24 s, a cell may need to provide extension of SFN. The extension of SFN may be called a hyper SFN (HSFN). Namely, if a certain cell does not support extension of SFN or HSFN, extension of a DRX cycle should be limited to a value below 10.24 s. For efficient eDRX operation, when a serving cell does not support an extended SFN or eDRX, UE behavior is required to be defined clearly.

In order to solve the problem described above, a method for operating at a cell not supporting eDRX according to an embodiment of the present invention is proposed. According to an embodiment of the present invention, if a serving cell does not support an extended SFN (i.e. a SFN value beyond 1024) or if a serving cell does not support eDRX, the UE configured for eDRX may trigger TAU. Alternatively, the UE configured for eDRX may not perform eDRX for the paging reception and apply normal paging DRX cycle while being at the serving cell not supporting eDRX. Alternatively, the UE configured for eDRX may consider the cell as barred. Alternatively, the UE configured for eDRX may deprioritizes a cell reselection priority for the cell or the frequency of the cell. In the description below, eDRX in idle mode may be focused for the sake of convenience. However, the present invention is not limited thereto, and may also be applied to eDRX in connected mode.

Figure 6:
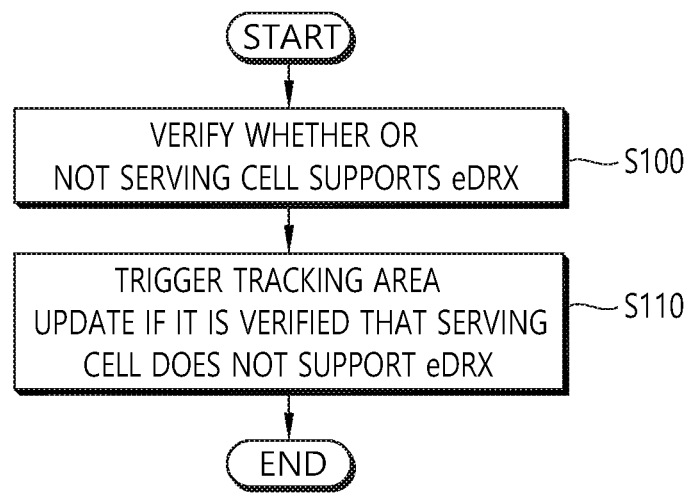
FIG. 6 shows a method for operating, by a UE, at a cell not supporting eDRX or an extended SFN according to an embodiment of the present invention.

FIG. 6 shows a method for operating, by a UE, at a cell not supporting eDRX or an extended SFN according to an embodiment of the present invention.

In step S100, upon cell reselection, the UE configured for eDRX verifies whether or not a serving cell supports eDRX. Further, the UE may verify whether or not the serving cell supports an extended SFN. The extended SFN may correspond to a SFN value beyond 1024. Verifying whether or not a serving cell supports eDRX or extended SFN may be performed by receiving system information from the serving cell.

If a serving cell does not support eDRX or extended SFN, at least one of the following options may be performed.

(1) In step S110, the UE configured for eDRX may trigger a TAU. The UE may further transmit an uplink message, which is one of a NAS message or an RRC message, to the network. The uplink message may indicate that the serving cell does not support eDRX or extended SFN. Or, the uplink message may indicate that the UE changes to a normal DRX cycle. Upon receiving the uplink message, the network, such as MME, reconfigures eDRX cycle to normal DRX cycle for paging the UE by transmitting a downlink message to the UE.

(2) The UE configured for eDRX may not perform eDRX for the paging reception and apply the normal DRX cycle while being at the serving cell. When the UE moves to another cell supporting eDRX, the UE may apply the eDRX cycle again.

(3) The UE configured for eDRX may consider the serving cell as barred.

(4) The UE configured for eDRX may deprioritize a cell reselection priority for the serving cell or the frequency of the serving cell. The cell reselection priority may be either a frequency priority or a cell priority. For example, the priority for the cell or priority for the frequency of the cell may be considered as the lowest priority in cell reselection.

Figure 7:
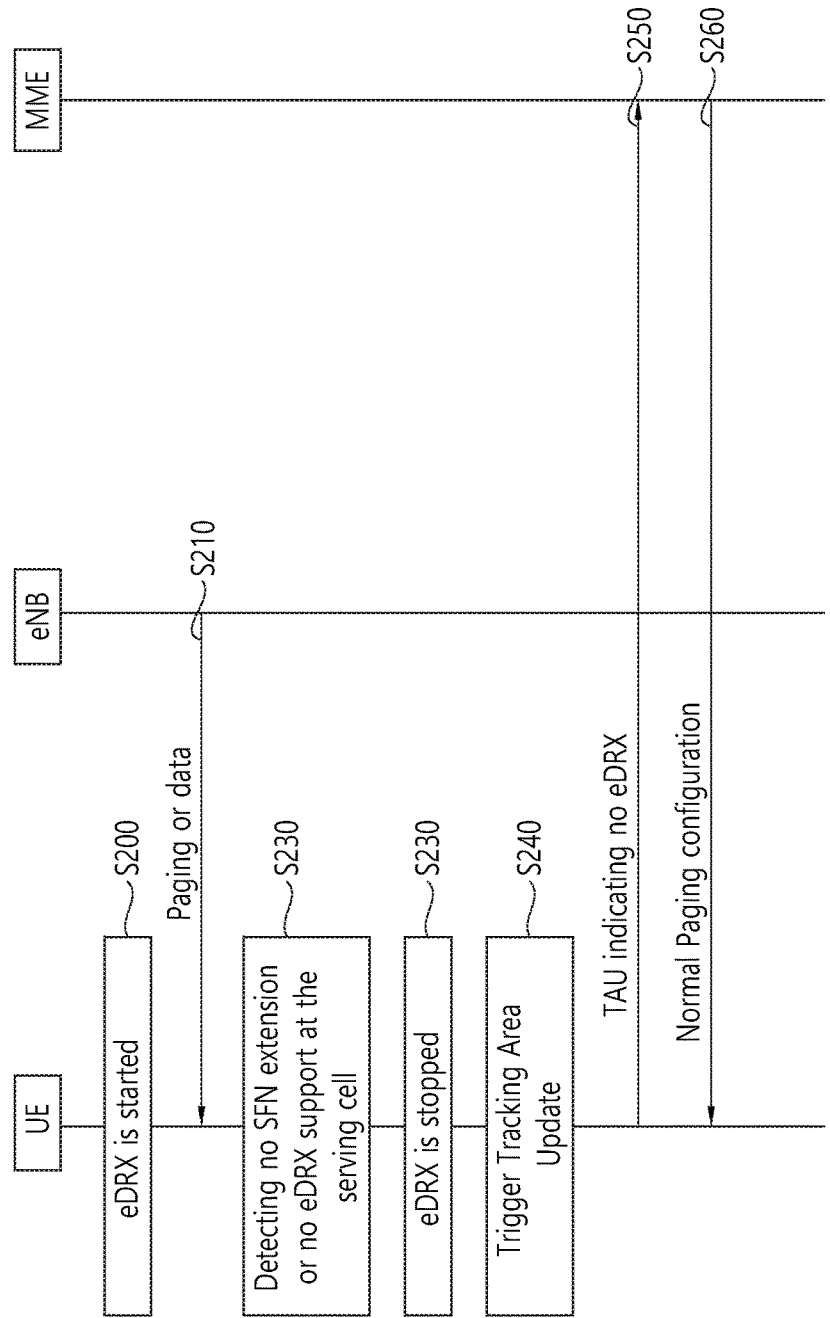
FIG. 7 shows an eDRX paging procedure in RRC_IDLE according to an embodiment of the present invention.

FIG. 7 shows an eDRX paging procedure in RRC_IDLE according to an embodiment of the present invention.

Before performing eDRX, the UE may verify whether a serving cell or a serving PLMN (either registered PLMN or selected PLMN) supports an eDRX cycle which is extended to a value beyond 2.56 s. The UE may verify this characteristic based on one of system information broadcast by the serving cell, a UE dedicated RRC message, a NAS message transmitted by the MME, an application message transmitted by an application server, or open mobile alliance (OMA) signaling. Upon verifying, the UE may be configured to perform eDRX if the serving cell supports eDRX or the serving PLMN supports eDRX. The MME may configure a UE to perform eDRX during attach or TAU. If the UE is configured for eDRX, the UE monitors paging or PDCCH according to eDRX cycle which is longer than a normal DRX cycle. Accordingly, in step S200, the UE starts eDRX cycle.

In step S210, the UE receives system information from the serving cell. Upon cell reselection, the UE configured for eDRX verifies whether or not a serving cell supports eDRX or extended SFN (i.e. a SFN value beyond 1024) or whether the serving cell supports eDRX. In step S220, the UE detects that the serving cell does not support eDRX or extended SFN. Therefore, in step S230, the eDRX cycle is stopped.

In step S240, the UE configured for eDRX triggers tracking area update. In step S250, the UE transmits an uplink message to the network. The uplink message may be one of a NAS message or an RRC message. The uplink message may indicate that the serving cell does not support eDRX or extended SFN. Or, the uplink message may indicate that the UE changes to normal paging DRX cycle.

Upon receiving the uplink message, in step S260, the network such as MME reconfigures eDRX cycle to normal DRX cycle for paging the UE by transmitting a downlink message to the UE. The UE configured for eDRX does not perform eDRX for the paging reception and apply normal paging DRX cycle while being at the serving cell. When the UE moves to another cell supporting eDRX, the UE may come back to eDRX cycle.

Further, the UE configured for eDRX may consider the cell as barred. Further, the UE configured for eDRX may deprioritize a cell reselection priority for the cell or for the frequency of the cell (assuming that the priority may be either frequency priority or cell priority). For example, the priority for the cell or the frequency of the cell may be considered as the lowest priority in cell reselection.

Figure 8:
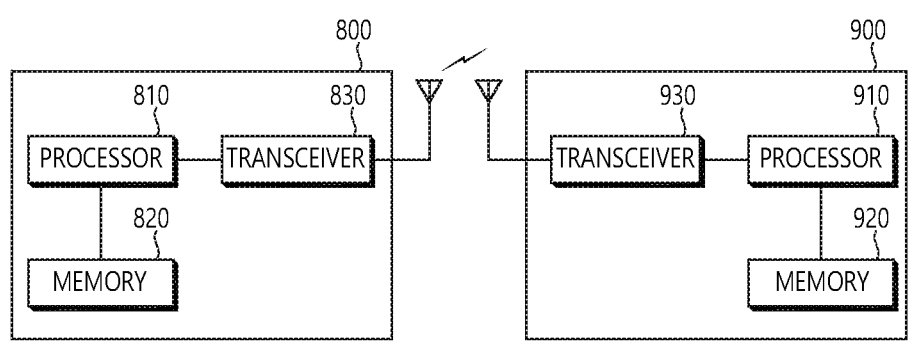
FIG. 8 shows a wireless communication system to implement an embodiment of the present invention.

FIG. 8 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. That is, the processor 910 may verify whether or not a serving cell supports eDRX, and trigger TAU if it is determined that the serving cell does not support eDRX. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a user equipment (UE) supporting an extended discontinuous reception (eDRX) in a wireless communication system, the method comprising:
   receiving, from a serving cell, system information informing that the serving cell does not support the eDRX;
   transmitting a tracking area update (TAU) message to a mobility management entity (MME);
   receiving a downlink message for a normal DRX cycle from the MME;
   monitoring a paging signal in a radio resource control (RRC) idle mode based on the normal DRX cycle at the serving cell;
   deprioritizing a cell reselection priority for the serving cell which does not support the eDRX;
   performing cell reselection to another cell which supports the eDRX, based on the deprioritized cell reselection priority; and
   monitoring a paging signal based on a eDRX cycle, which is longer than the normal DRX cycle, at the another cell.

2. The method for claim 1, further comprising verifying whether or not the serving cell supports an extended system frame number (SFN).

3. The method for claim 2, wherein the extended SFN corresponds to a SFN value beyond 1024.

4. The method for claim 1, further comprising transmitting an uplink message which indicates that the serving cell does not support eDRX or the UE changes to a normal DRX cycle to a network.

5. The method for claim 4, wherein the uplink message is a one of a non-access stratum (NAS) message or a radio resource control (RRC) message.

6. The method for claim 4, further comprising receiving a downlink message which indicates a reconfiguration of eDRX cycle to the normal DRX cycle from the network.

7. The method for claim 1, wherein the serving cell is considered as barred.

8. A user equipment (UE) supporting an extended discontinuous reception (eDRX) in a wireless communication system, the UE comprising:
   a memory;
   a transceiver; and
   a processor coupled to the memory and the transceiver, wherein the processor is configured to:
     control the transceiver to receive system information informing that a serving cell does not support the eDRX from the serving cell;
     control the transceiver to transmit a tracking area update (TAU) message to a mobility management entity (MME);
     control the transceiver to receive a downlink message for a normal DRX cycle from the MME;
     monitor a paging signal in a radio resource control (RRC) idle mode based on the normal DRX cycle at the serving cell;
     deprioritize a cell reselection priority for the serving cell which does not support the eDRX;
     perform cell reselection to another cell which supports the eDRX, based on the deprioritized cell reselection priority; and
     monitor a paging signal based on a eDRX cycle, which is longer than the normal DRX cycle, at the another cell.

9. The UE for claim 8, wherein the processor is further configured to verify whether or not the serving cell supports an extended system frame number (SFN).

10. The UE for claim 9, wherein the extended SFN corresponds to a SFN value beyond 1024.

11. The UE for claim 8, wherein the processor is further configured to control the transceiver to transmit an uplink message which indicates that the serving cell does not support eDRX or the UE changes to a normal DRX cycle to a network.

12. The UE for claim 11, wherein the processor is further configured to control the transceiver to receive a downlink message which indicates a reconfiguration of eDRX cycle to the normal DRX cycle from the network.

* * * * *